US006182189B1

(12) United States Patent
Alexis et al.

(10) Patent No.: US 6,182,189 B1
(45) Date of Patent: Jan. 30, 2001

(54) METHOD AND APPARATUS FOR PLACING A MEMORY IN A READ-WHILE-WRITE MODE

(75) Inventors: Ranjeet Alexis, Folsom; Peter K. Hazen, Auburn; Charles W. Brown, Folsom; Robert E. Larsen, Shingle Springs, all of CA (US)

(73) Assignee: Intel Corporation, Santa Clara, CA (US)

( * ) Notice: Under 35 U.S.C. 154(b), the term of this patent shall be extended for 0 days.

(21) Appl. No.: 09/002,691

(22) Filed: Jan. 5, 1998

(51) Int. Cl.$^7$ ........................................... G06F 13/00
(52) U.S. Cl. ..................... 711/103; 711/154; 365/189.04
(58) Field of Search ............................ 711/103, 154; 365/185.11, 189.04, 230.03

(56) References Cited

U.S. PATENT DOCUMENTS

| | | | |
|---|---|---|---|
| 5,245,572 | 9/1993 | Kosonocky et al. | 365/185.11 |
| 5,361,227 | 11/1994 | Tanaka et al. . | |
| 5,361,343 | 11/1994 | Kosonocky et al. | 365/185.11 |
| 5,426,603 | 6/1995 | Nakamura et al. . | |
| 5,483,486 | 1/1996 | Javanifard et al. . | |
| 5,590,074 | 12/1996 | Akaogi et al. . | |
| 5,625,595 | 4/1997 | Ikeda . | |
| 5,648,929 | 7/1997 | Miyamoto | 365/185.04 |
| 5,732,030 | 3/1998 | Dorney . | |
| 5,748,528 | 5/1998 | Campardo et al. | 365/185.13 |
| 5,751,634 | 5/1998 | Itoh . | |
| 5,796,657 | 8/1998 | Lee . | |
| 5,867,430 | * 2/1999 | Chen et al. | 365/189.04 |
| 5,917,744 | 6/1999 | Kirihata et al. . | |
| 5,936,884 | 8/1999 | Hasbun et al. . | |
| 5,949,713 | 9/1999 | Bedarida et al. . | |

OTHER PUBLICATIONS

Advanced Micro Devices, Inc., AM29DL800T/ Am29DL800B (preliminary), Publication #21357, Rev. A, Amendment/0, May 1997.*
Sharp Press Release, "Sharp Electronics Corporation Announces Unique Dual–Task 4 Mbit Flash Memory", pp. 1–2, Aug. 1, 1996.
Mitsubishi Press Release, Mitsubishi Announces Backgraoud Operation Feature in High Density, 8–Mbit Dinor Mobile Flash Memory, pp. 1–3, May 19, 1997.
Sharp Corporation, "Flash Memory LH28F800SUTD", Ver. 1 (Preliminary), pp. 1–37, Dec. 9, 1996.
International Seach Report, PCT/US98/25217, 5 pages.

* cited by examiner

Primary Examiner—David L. Robertson
(74) Attorney, Agent, or Firm—Cindy Faatz (57) ABSTRACT

An interface for a read-while-write memory. A memory device includes a single-chip memory array and an interface that is responsive to one or more commands to configure the memory array in a read-while-write configuration.

12 Claims, 5 Drawing Sheets

METHOD AND APPARATUS FOR PLACING A MEMORY IN A READ-WHILE-WRITE MODE

FIELD OF THE INVENTION

The present invention relates generally to memory devices and more particularly to an interface for accessing memories that include hardware read-while-write capabilities.

BACKGROUND OF THE INVENTION

There are many different types of memory devices available today with a wide range of capabilities and operating characteristics. As with many other types of integrated circuit devices, there is a focus on increasing memory device performance, speed, and utility while reducing power consumption or maintaining power consumption at a low level.

Flash memory, an increasingly popular type of memory, is a nonvolatile memory that is electrically erasable and electrically programmable. In many cases, flash memories are now being used for functions traditionally provided by Electrically Erasable Programmable Read Only Memories (EEPROMs) and Static Random Access Memories (SRAMs). Such applications include Basic Input/Output System (BIOS) memories, for example.

There are three basic types of memory access operations that are typically performed in a flash memory: a write (also referred to as program) operation, an erase operation and a read operation.

In currently available flash memories, each of the different memory access operations requires a different amount of time, or latency, to perform. For example, in some current flash memories, a read operation may take approximately 100 nanoseconds to perform, while a program operation may require about 10 microseconds and an erase cycle may take as long as one second to perform.

The difference between the time required for erase and program cycles versus the time required for a read cycle is significant. Therefore, it is advantageous to be able to perform read operations while either program or erase cycles are in process. A flash memory or other memory that provides these capabilities is referred to as a "read-while-write" (RWW) memory.

RWW memories provide increased efficiency along with other advantages. For example, in some prior systems, multiple memory devices are provided such that read and write or program operations can be performed concurrently in order to achieve higher system performance. Using memories that include RWW capability, it may be possible to achieve the same system performance level using fewer memory devices.

Flash memories, like other memories, include an interface that controls operation of the read and write circuitry of the flash memory in response to commands it receives from a processor or other external source. The interface, referred to alternately as a command interface, a user interface, or a command user interface, generally supports a specific set of commands. The supported command set determines, to some extent, the software required to interact with the flash memory.

In some current systems using non-RWW flash memories, if a read request or command is received by a non-RWW flash memory while a write or erase operation is being performed, the read command is not recognized by the flash user interface and may produce an error. For one currently available non-RWW memory, instead of processing the read command, the flash interface controls a flash memory status register to provide status information indicating a status of the write operation being performed. For such a memory, the read command cannot be processed until the write or erase operation is either completed or suspended.

Because of this constraint, if the system cannot tolerate the read/write suspend latency before reading code, then the system may not be able to store both data and code in the same device.

Thus, there is an issue with respect to using existing non-RWW flash memory interfaces for RWW memories.

SUMMARY OF THE INVENTION

An interface method and apparatus for a memory including read-while-write capabilities is described. For one embodiment, a memory device includes a single-chip memory array and an interface responsive to one or more commands to configure the memory array in a read-while-write configuration.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

An interface for accessing memories including read-while-write capabilities is described. Although the following embodiments are described with reference to a flash memory, other embodiments are applicable to other types of memories that are capable of performing read operations from one area of a memory device or array while concurrently performing program or erase and verify operations in another area of the memory array.

An intended advantage of one or more embodiments described below is to provide an interface for a read-while-write memory to support read-while-write (RWW) capabilities. Another intended advantage of one or more embodiments includes maintaining software compatibility with prior non-RWW memory interfaces.

For one embodiment, read-while-write capability is provided without adding an additional command to the command set used for non-RWW memories. For this embodiment, an interface receives a first type of memory access request to access a first area of a memory followed by a second type of memory access request to access a second area of the memory. The sequence of commands along with the locations requested to be accessed enables a read-while-write mode in the memory. Internal control circuitry operates in conjunction with the interface to enable and control read-while-write operation.

For another embodiment, a memory interface is responsive to a discrete read-while-write command to configure the memory as a read-while-write device. For one embodiment, configuring the memory as a read-while-write device allows a READ command directed to one area of the memory that is received while a WRITE command directed to another area of the memory is being processed to be processed. For another embodiment, the command assigns one area of the memory array as a read "plane" and another area of the memory array as a write plane. Read-while-write (RWW) circuitry configures the read and write planes appropriately in response to the discrete read-while-write command for one embodiment. Each of the above embodiments is described in more detail below.

Figure 1:
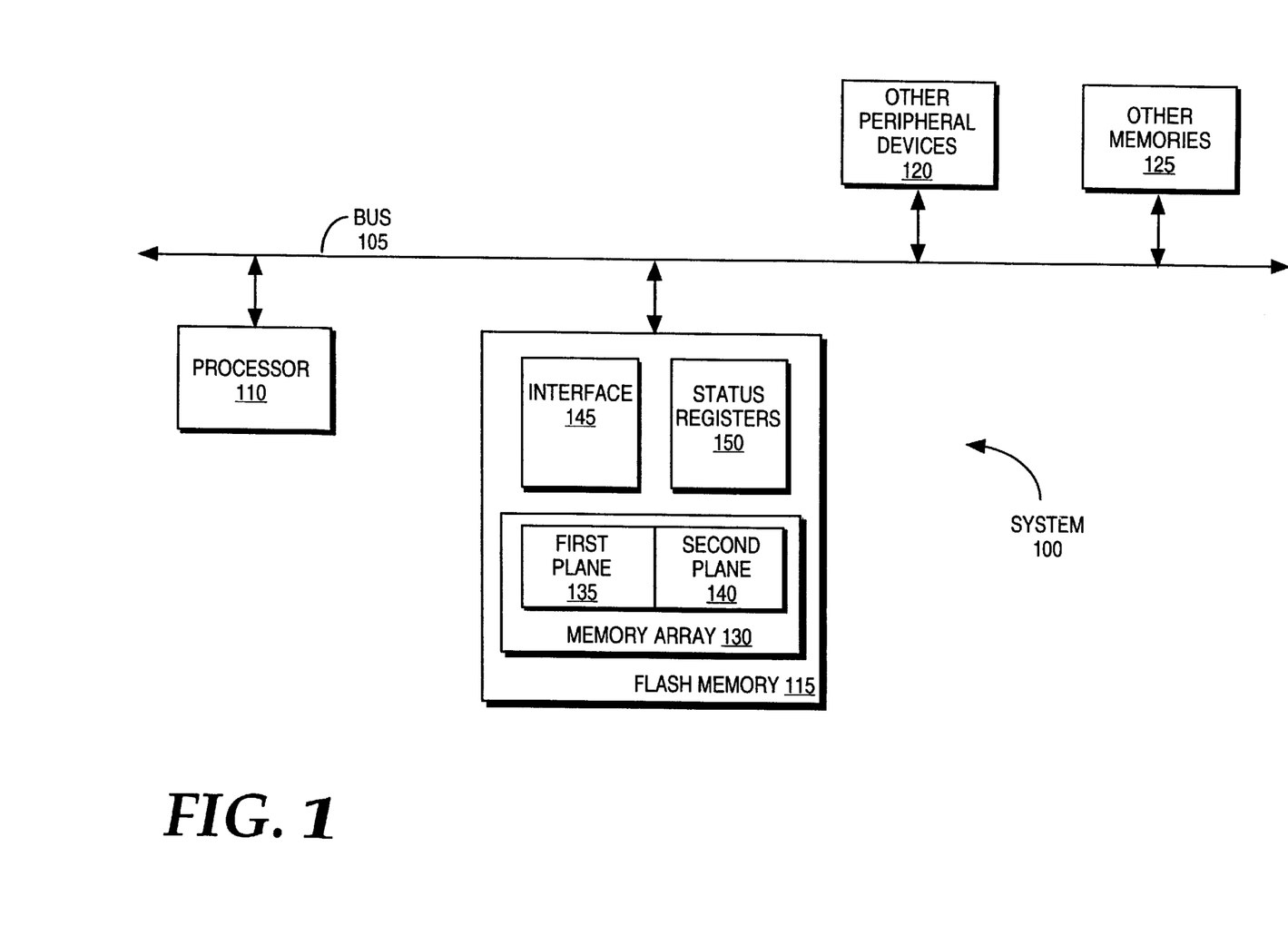
FIG. 1 is a block diagram of a system including a memory having read-while-write capabilities.

FIG. 1 shows a block diagram of a system 100 in which one embodiment may be implemented. The system 100 may be a computer system, a cellular phone, an engine control system, or a digital camera, for example. Other types of systems may also benefit from use of the present invention.

The system 100 of FIG. 1 includes a system bus 105, a processor 110 coupled to the system bus 105, and a flash memory 115, also referred to as a flash electrically programmable read only memory (EPROM) also coupled to the system bus 105. The system 100 may include other peripheral devices 120 coupled to the system bus 105 such as an input and/or output device, for example and/or other memories 125 such as a static random access memory (SRAM), a mass storage device, or a read-only memory (ROM).

The flash memory 115 includes a memory array 130 including two sections referred to as a first plane 135 and a second plane 140. The first and second planes 135 and 140 include different physical memory locations in a contiguous memory array 130 for one embodiment. For an alternate embodiment, the first and second memory planes are each located on a different integrated circuit device. Further, for alternate embodiments, there may be more than two planes in the memory array 130.

For one embodiment, for example, the planes may be configured in the manner described in copending U.S. patent application Ser. No. 09/002,649 entitled "Flash Memory Partitioning for Read-While-Write Operation", filed on the same date and assigned to the same assignee as the present application.

For one embodiment, when the flash memory 115 is in a read-while-write mode, one of the first or second planes is configured as a read plane while the other plane is configured as a write plane. Alternatively, when the flash memory 115 is in a read-while-write mode a first type of memory access command directed to one plane can be processed while a second type of memory access command is being processed in another plane of the flash memory 115. In this case, the configuration of the first and second planes is responsive to the particular memory access commands. The first and second planes are described in more detail below with reference to FIG. 2.

The flash memory 115 also includes an interface 145, alternately referred to as a user interface, and status registers 150. The interface 145 controls communication between the flash memory 115 and other components such as the processor 110. The interface receives commands from other components in the system 100 over the bus 105 and controls circuitry within the flash memory 115 to respond to the commands. Such commands may include memory read, write and erase requests for example.

The status registers 150 for one embodiment include a status register corresponding to each of the first plane 135 and the second plane 140. For alternate embodiments, a single status register may be used for both the first and the second planes. The status registers 150 provide a status of a memory access operation to a corresponding plane, for example.

Figure 2:
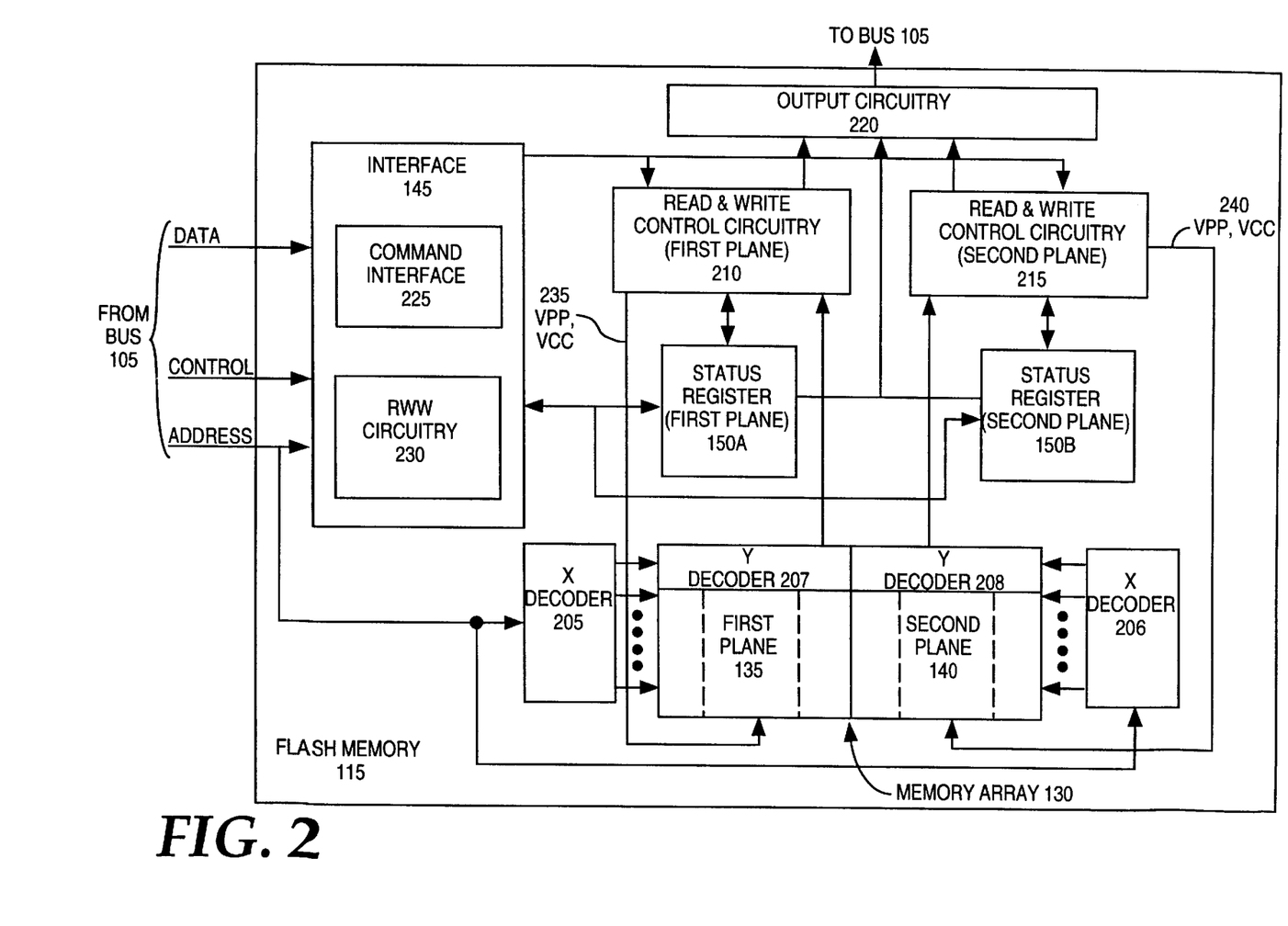
FIG. 2 is a block diagram showing the flash memory of FIG. 1 in more detail.

FIG. 2 is a block diagram showing the flash memory 115 of one embodiment in more detail. Along with the memory array 130, the interface 145 and the status registers 150, the flash memory 115 includes X decoders 205 and 206 and Y decoders 207 and 208 to determine the memory location(s) to be accessed in response to a memory access request, read and write control circuitry 210 and 215 and output circuitry 220.

The interface 145 of one embodiment receives data, control and address information from the bus 105. For one embodiment, the interface 145 includes a command interface 225 and read-while-write (RWW) circuitry 230. The command interface 225 includes the command decoding and control circuitry used to interface with the flash memory 115. The command interface 225 supports the same command set as is used for similar memories that do not include RWW capability. Thus, the command interface 225 does not support a discrete read-while-write command.

For example, the command interface 225 of one embodiment decodes and supports the standard flash memory command set used in conjunction with non-RWW flash memories from Intel Corporation of Santa Clara, Calif. For other embodiments, the command interface may decode and support a different command set that also does not include a discrete RWw command, and that can be used to interface with non-RWW memories.

The RWW circuitry 230 operates together with the command set 225 to enable and control a read-while-write mode in the flash memory 115. "Read-while-write mode" as the terminology is used herein refers to a mode in which each of the first and second planes 135 and 140 are independently configured such that a memory access command directed to the first plane 135 can be performed concurrently with performance of a memory access command to the second plane 135.

The RWW circuitry 230 decodes an address associated with a command received by the interface 145 to determine whether a read-while-write mode is to be initiated. The RWW circuitry 230 further operates to configure the flash memory 115 to provide RWW functionality if a RWW mode is to be initiated. The operation of the RWW circuitry 230 is described in more detail below.

The memory array 130 includes two sections referred to herein as planes as described above. The first and second planes 135 and 140 may be independently configured and controlled in response to memory access requests directed to the particular planes. Thus, the voltage level required for a read operation may be supplied to one plane while the voltage level(s) required for a write or erase operation may be supplied to the other plane. In this manner, read and write operations directed to the memory array 130 may be performed concurrently.

For example, when the flash memory 115 is operating in a read-while-write mode, a memory read operation involving memory location(s) in the first plane 135 may be performed concurrently with a memory write operation involving memory location(s) in the second plane 140. For some embodiments, two memory access operations of the same type (e.g. two reads), one directed to the first plane 135 and one directed to the second plane 140 may be performed concurrently. For other embodiments, while two memory read operations may be performed concurrently, two memory write operations may not. Further, for some embodiments, the memory array includes more than two planes, each of which may be independently configured, accessed and controlled.

The flash memory 115 includes read and write control circuitry coupled to the interface 145 and to the memory array 130. The read and write control circuitry includes read and write control circuitry 210 to control memory access operations directed to the first plane 135 and read and write control circuitry 215 to control memory access operations directed to the second plane 140. Each of the read and write control circuits 210 and 215 includes voltage control circuitry to supply the correct potential to the associated plane for each memory access operation along with other circuitry not shown. For another embodiment, the flash memory includes only one read control circuit that is selectively coupled to control read accesses to the read plane when the memory is configured in a RWW mode and/or one write control circuit that is selectively coupled to control write or erase accesses to the write plane when the memory is configured in a RWW mode.

The flash memory 115 also includes a status register for each of the first and second planes 135 and 140 of the memory array 130 for one embodiment. The status register 150A is associated with the first plane 135 and the status register 150B is associated with the second plane 140. The status registers 150A and 150B are coupled to the interface 145, and the output circuitry 220. The status register 150A is coupled to the read and write control circuitry 210 for the first plane and the status register 150B is coupled to the read and write control circuitry 215 for the second plane.

The status register 150A provides a status of memory access operations to the first plane 135 while the status register 150B provides a status of memory access operations to the second plane. Status register information may be used internally for RWW operation as described below. Status register information may also be output to the bus 105 in response to a memory status command received by the interface 145 from the bus 105.

Output circuitry 220 is coupled to the read and write control circuitry 210 and 215 and to the status registers 150A and 150B. The output circuitry 220 for one embodiment includes an output multiplexor and output buffers. The output circuitry 220 operates to communicate data from the flash memory 115 to the bus 105.

The operation of the interface 145 of one embodiment is now described with continuing reference to FIG. 2. A first memory access command of a first type is received by the interface 145 from the bus 105. An address associated with the first memory access command is also received by the interface 145 and is concurrently forwarded to the X and Y decoders 205, 206, 207 and 208 to determine the memory location(s) to be accessed.

For purposes of example, it is assumed that the first memory access command is a memory write request and the address indicates a location in the first plane 135. It is also assumed that the status register 150A indicates that there are currently no memory access operations in process involving the first plane 135. The read and write control circuitry 210 then operates to bring the first plane to the proper voltage level for a write operation. The X decoder 205 and the Y decoder 207 operate in conjunction with the read and write control circuitry 210 to access the requested location(s) in the first plane to service the memory write request.

After the memory write request directed to the first plane is received by the interface 145 and while the memory write operation to the first plane is being processed, a second memory access operation of a second type, a memory read operation in this example, is received by the interface 145. The address of a memory location to be read is concurrently received by the interface 145, the address for this example indicating a location in the second plane 140.

The RWW circuitry 230 then initiates a read-while-write mode such that the memory read operation directed to the second plane 140 can be serviced while the memory write operation to the first plane 135 is in process. For current non-RWW memories, a read command received while a write operation is in process is invalid.

The RWW circuitry 230 initiates the RWW mode for one embodiment by causing the read and write control circuitry 215 associated with the second plane 140 to configure the second plane 140 as a read plane. Thus, the first plane 135 is configured as a write plane while the second plane 140 is configured as a read plane. For this embodiment, subsequent read operations directed to the second plane 140 continue to be serviced concurrently without requiring reconfiguration of the memory array 130. For another embodiment, initiation of the RWW mode does not necessarily include configuration of each of the first and second planes 135 and 140. For this embodiment, RWW configuration enables a first type of memory access command to one of the first or second planes 135 or 140 to be processed while a different type of memory access command is being processed in the other plane.

Thus, for one embodiment, the RWW circuitry 230 initiates a read-while-write mode any time a first type of memory access command directed to a first plane is received while a second type of memory access command to a second plane is being processed. In this case, the types of memory access commands include 1) a read command or 2) a write (program) or erase command. For another embodiment, two commands of a same type directed to different planes may be concurrently processed. Also, for one embodiment, for sequences that do not initiate a RWW mode, the flash memory operates in the same manner as a similar, non-RWW flash memory.

The interface 145 and the RWW circuitry 230 determine whether a particular command is valid or invalid and whether a read-while-write mode is to be initiated using information from the status registers 150A and 150B and the address of the command received. The status registers 150A and 150B indicate the status and type of a memory access operation being performed in a particular plane.

For one embodiment, for example, if a read request directed to the first plane is received while a write request is being serviced in the first plane, the RWW circuitry 230 determines that the read request is invalid, or cannot be serviced until the write operation has been completed or suspended. Similarly, if a write request directed to the first plane is received while a read request is being processed in the first plane, the write request will be invalid or will not be serviced until the read request to the first plane is completed.

For one embodiment, for successive memory access requests received by the interface that are directed to different planes in the memory array, Table 1 below describes the command sequences that are valid. The first two valid sequences for this embodiment cause the interface to initiate RWW configuration or otherwise place the memory array in a RWW mode as shown below.

TABLE 1

| 1ST COMMAND | 2ND COMMAND | VALID/INVALID | MODE |
| --- | --- | --- | --- |
| READ | WRITE | VALID | RWW |
| WRITE | READ | VALID | RWW |
| READ | READ | VALID | NON-RWW |
| WRITE | WRITE | INVALID | NON-RWW |

For this embodiment, the last command sequence shown in Table 1 is invalid because only one write control circuit (or write state machine) is provided such that only one program or erase command may be performed at one time. For other embodiments, the valid and invalid command sequences may be different from those described above. For example, for some embodiments, two successive write requests may be valid. Also, for some embodiments, two successive read requests to different planes may not cause the interface to configure the memory array in a non-read-while-write configuration.

The above-described embodiments provide the advantage that a read-while-write mode may be initiated in a memory without adding any commands to an existing command set. In this manner, software developed to work with existing memories that do not include read-while-write capabilities can be used for such read-while-write memories. This provides designers with more flexibility in terms of being able to use different types of memories without requiring a software change, and helps to reduce development time in a transition from a system designed for non-RWW memories to a system including RWW memories.

Also, by using an address decoding approach (i.e. determining the manner in which the planes are to be configured for RWW operation based on the addresses to which memory requests are directed), the first and second planes are easily configured to provide read-while-write capability.

Figure 3:
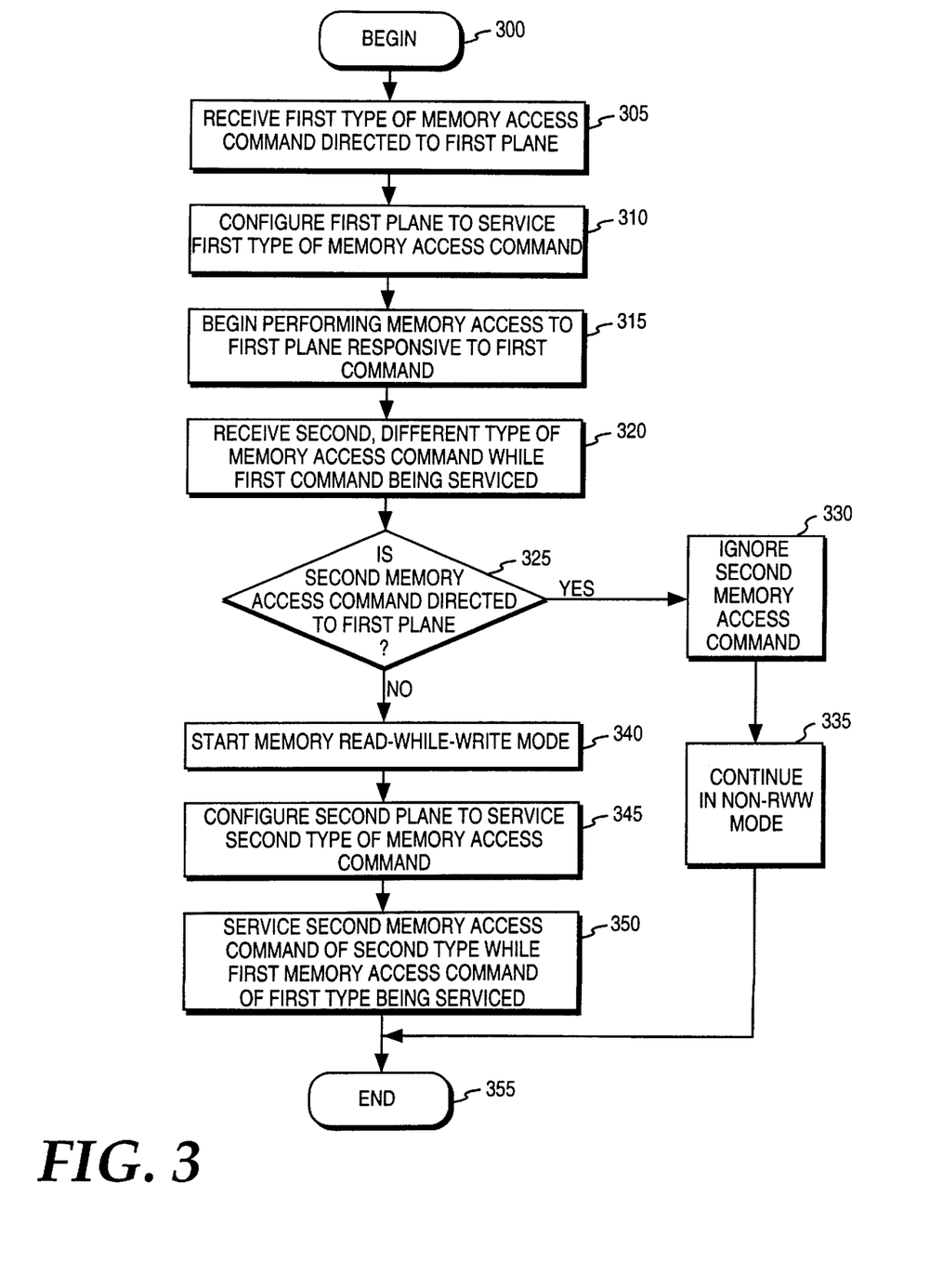
FIG. 3 is a flow diagram showing the read-while-write method of one embodiment.

FIG. 3 is a flow diagram showing the read-while-write memory interface method of one embodiment beginning at step 300. At step 305, a first memory access command of a first type directed to a first plane of a memory array is received. For one embodiment, the first memory access command is a memory write or memory erase command, but may be a memory read command for other embodiments.

At step 310, the first plane is configured to service the first memory access command. Thus, where the first memory access command is a write or erase command, the first plane is configured as a write plane receiving the proper supply voltage and control signals for performance of the appropriate operation. At step 315, servicing of the first memory access command begins.

At step 320, a second memory access command of a second type (a memory read command if the first command was a memory write or erase command), is received while the first memory access command is being serviced. At decision block 325, it is determined whether the second memory access command is directed to the first plane of the memory. If so, then at step 330, the second memory access command is ignored at least while the first memory access command is processing. This sequence may produce an error. For some embodiments, the second memory access command is queued until the first memory access operation is completed and, if necessary, the memory is reconfigured to service the second memory access command to the first plane. At step 335, if the second memory access command is ignored, the memory continues in a non-read-while-write mode.

Referring back to decision block 325, if the second memory access command of the second type is not directed to the first plane, then in step 340, a memory read-while-write mode is started. In step 345, a second memory plane is configured to service the second memory access command. Where the second memory access command is a read command, the second plane is configured as a read plane receiving the proper supply voltage and control signals for performance of read operations.

At step 350, the second memory access command is serviced (i.e. a read operation is performed for one embodiment) in the second plane while the first memory access command is being serviced (i.e. a write or erase operation is performed for one embodiment) in the first plane. The method ends at step 355.

Figure 4:
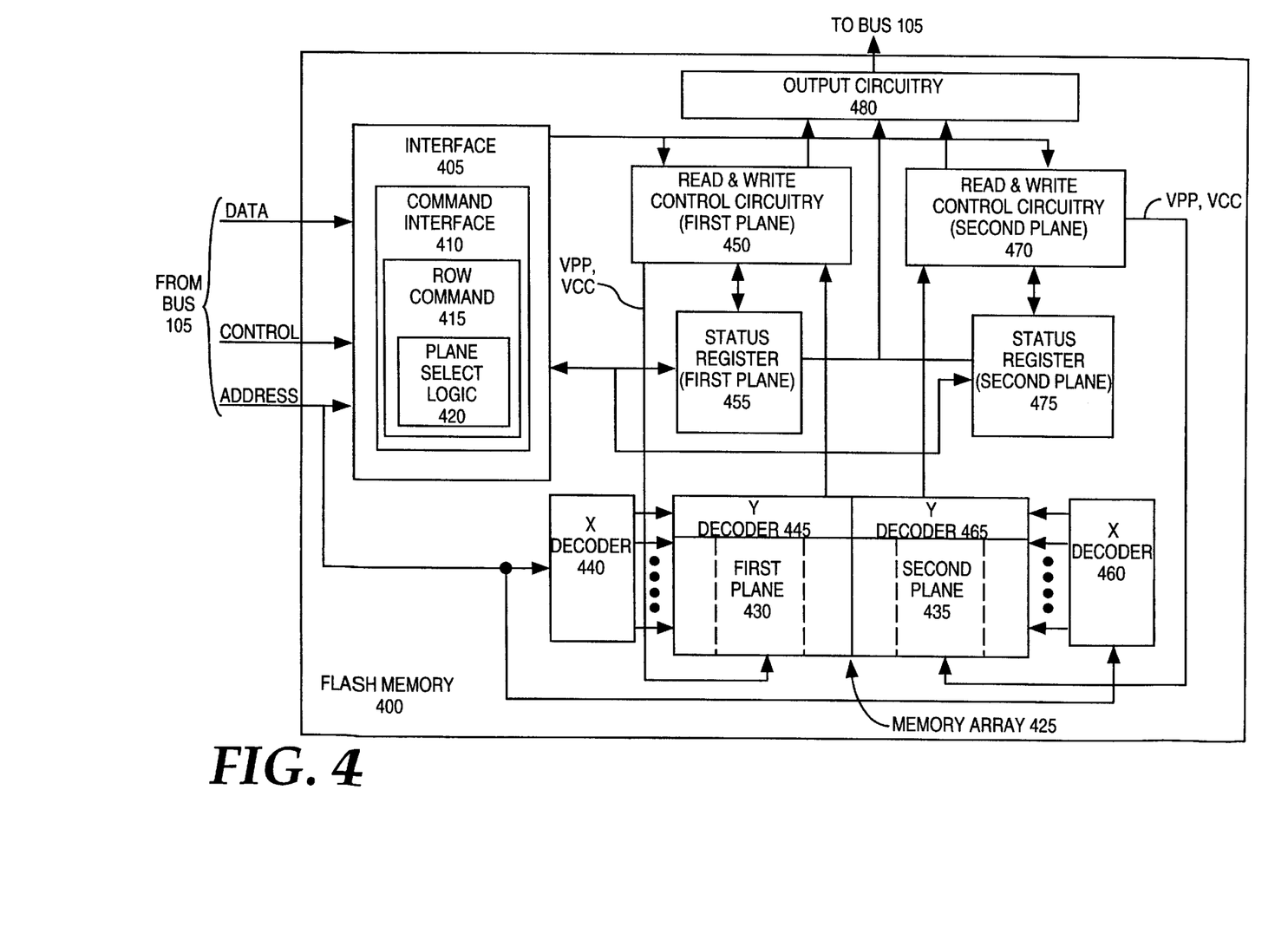
FIG. 4 is a block diagram of a flash memory of an alternate embodiment.

FIG. 4 is a block diagram of a flash memory 400 of an alternate embodiment. The flash memory 400 may also be used in the system 100 of FIG. 1 as a replacement or in addition to the flash memory 115 or in a different system. For the flash memory 400 of FIG. 4, elements with similar names operate in a similar manner to like elements described above with reference to FIG. 2 except as discussed below.

For the embodiment of FIG. 4, the interface 405 includes a command interface 410. The command interface 410 of the flash memory 400 includes read-while-write command logic 415 to enable a discrete READ-WHILE-WRITE (RWW) command. The discrete RWW command supported by the flash memory 400 enables a user to selectively place the flash memory 400 in a read-while-write mode using a single command. For one embodiment, the discrete RWW command also enables the user to identify the configuration of the memory array 425 to select a read plane and/or a write plane as described below.

As in the flash memory 115 of FIG. 2, the flash memory 400 includes a memory array 425 having a first plane 430 and a second plane 435, each of which can be independently accessed and controlled. The X decoder 440, the Y decoder 445, the read and write control circuitry 450 and the status register 455 provide the access, control and status functions for the first plane 430. The X decoder 460, the Y decoder 465, the read and write control circuitry 470 and the status register 475 provide the access, control and status functions for the second plane 435. The output circuitry 480 is coupled to the status registers 455 and 475 and to the read and write control circuitry 450 and 470 for outputting information from the flash memory 400 to the bus 105.

The RWW command logic 415 of one embodiment also includes plane configuration control logic 420. The plane configuration control logic 420 is responsive to user input to select the configuration of the first and second planes 430 and 435. In other words, the plane configuration control logic 420 controls whether each of the first and second planes 430 and 435 is configured to be a read plane or a write plane.

For one embodiment, the plane configuration control logic 420 selects one of the first and second planes 430 and 435 to be a read plane to service memory read requests or a write plane to service memory write or erase requests. The remaining plane is then selected to be configured in the opposite manner. For example, if the plane configuration control logic selects the first plane 430 to be configured as a read plane, the second plane 435 is automatically selected to be configured as a write plane. For an alternate embodiment, the first and second planes 430 and 435 are each individually configurable as either read or write planes.

The plane configuration control logic 420 for one embodiment is responsive to the RWW command itself to configure the read and write planes. For this embodiment, the RWW command itself indicates which of the first and second planes 430 and 435 is to be configured as a read plane. For this embodiment, the other plane is automatically configured as a write plane.

Once the memory array 425 is configured in response to the RWW command, for one embodiment, subsequent read operations to the read plane and write or erase operations to the write plane do not have to be delayed. Once the planes are configured, the read plane is at the appropriate voltage(s) for read operations, the write plane is at the appropriate voltage(s) for write operations and memory read and write operations to the corresponding planes may be processed concurrently.

For an alternative embodiment, the read and/or write planes are not configured until a corresponding memory access to the plane is received. For this embodiment, the flash memory 400 is in a read-while-write configuration when a memory access command of a first type directed to one of the first or second planes can be processed while a different type of memory access command is being processed in the other plane.

For one embodiment, once the flash memory 400 is in a read-while-write configuration, memory read requests directed to the write plane or memory write or erase operations directed to the read plane are invalid. Such requests must wait to be processed until the flash memory 400 is reconfigured. Reconfiguration may take place with another RWW command re-assigning the read and/or write planes as described above.

The embodiments described with reference to FIG. 4 provide the advantage that the flash memory 400 can be configured to operate in a read-while-write mode with a single command. Further, each of the first and second planes 430 and 435 can be selectively configured to be a read plane or a write plane depending on the memory access requests that need to be serviced.

Figure 5:
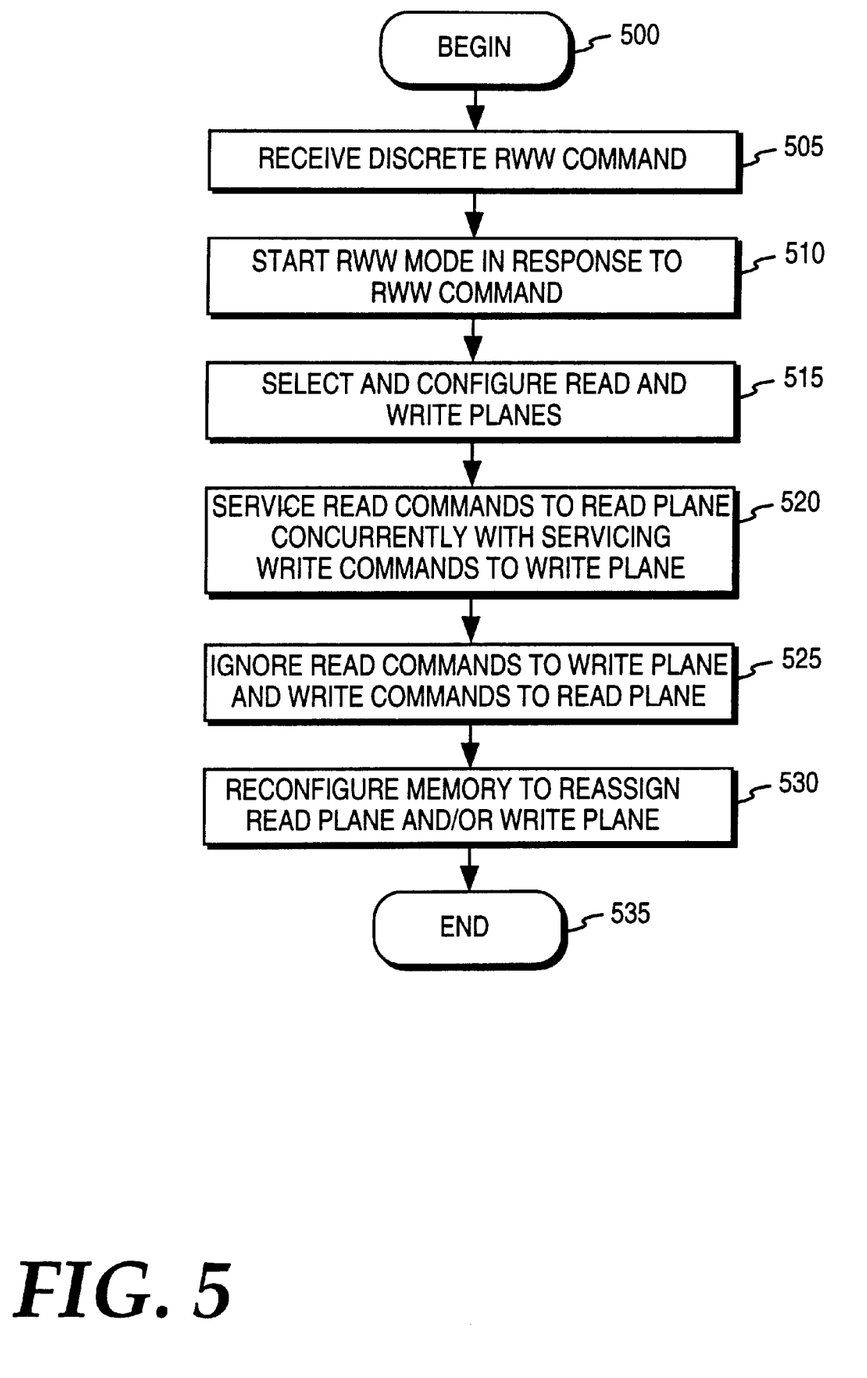
FIG. 5 is a flow diagram showing the read-while-write method of an alternate embodiment.

FIG. 5 is a flow diagram showing the read-while-write memory interface method of an alternate embodiment beginning at step 500. At step 505, a discrete read-while-write (RWW) command is received. For one embodiment, the discrete RWW command indicates the manner in which the memory to be accessed is to be configured. For example, the RWW command indicates whether each of two or more planes of the memory are to be configured to be a read plane or a write plane.

At step 510, a read-while-write mode is initiated in response to the RWW command. Initiation of the RWW mode includes the step 515 of selecting and configuring each of the planes of the memory to be a read plane to service read operations or a write plane to service write and/or erase operations. This configuration may be indicated in the RWW command itself or responsive to independent user input.

At step 520, read commands directed to a read plane and write commands directed to a write plane are serviced concurrently. In contrast, read commands directed to a write plane and write commands directed to a read plane are ignored at step 525. Commands that are ignored are queued for one embodiment until the memory is reconfigured to service the pending commands at step 530 where the read and/or write planes are reassigned and reconfigured in response to a second RWW command or independent user input. The method of this embodiment ends at step 535.

In the foregoing specification, the invention has been described with reference to specific exemplary embodiments thereof. It will, however be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A memory device comprising:

a single-chip memory array; and an interface responsive to a discrete READ-WHILE-WRITE command to configure the memory array in a read-while-write configuration.

2. The memory device of claim 1 wherein the memory array includes a first plane and a second plane and wherein, in a read-while-write configuration, one of the first or second planes is configured to be a read plane and the other plane is configured to be a write plane.

3. A method comprising:

receiving a discrete read-while-write command at a memory interface of a single-chip memory; and starting a memory read-while-write mode in the memory in response to the discrete read-while-write command.

4. The method of claim 3 wherein starting a memory read-while-write mode includes:

selecting a read plane and a write plane in the memory, configuring the read plane to service memory read operations, and configuring the write plane to service memory write or erase operations.

5. The method of claim 4 further including:

servicing read commands directed to memory locations in the read plane; and concurrently with servicing read commands, servicing write and erase commands directed to memory locations in the write plane.

6. The method of claim 4 further including:

ignoring read commands directed to memory locations in the write plane; and ignoring write and erase commands directed to memory locations in the read plane.

7. The method of claim 4 further including reconfiguring the memory to reassign the read plane and the write plane.

8. A read-while-write memory comprising:

a command interface that supports a discrete read-while-write command;

a single-chip memory array that is selectively configurable into a read plane and a write plane responsive to the command interface receiving the read-while-write command.

9. The read-while-write memory of claim 8 further including write control circuitry and read control circuitry, the write control circuitry being coupled to the write plane and the read control circuitry being coupled to the read plane.

10. The read-while-write memory of claim 8 wherein the memory array includes a first plane and a second plane and the read-while-write command indicates which plane of the first and second planes is the write plane.

11. A system comprising:

a bus;

a processor coupled to the bus;

a memory array coupled to the bus, the memory array being partitionable into first and second planes; and a read-while-write command interface coupled to the memory array, the read-while-write command interface to place the memory array into a read-while-write mode in response to receiving a discrete read-while-write command from the processor over the bus.

12. The system of claim 11 wherein the read-while-write command indicates which of the first and second planes to configure as a write plane, the write plane being configured to service memory write or erase operations.

\* \* \* \* \*